United States Patent
Blake

(10) Patent No.: US 7,809,701 B2
(45) Date of Patent: Oct. 5, 2010

(54) METHOD AND SYSTEM FOR PERFORMING EXACT MATCH SEARCHES USING MULTIPLE HASH TABLES

(75) Inventor: Steven Langley Blake, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 541 days.

(21) Appl. No.: 11/872,099

(22) Filed: Oct. 15, 2007

(65) Prior Publication Data
US 2009/0097654 A1   Apr. 16, 2009

(51) Int. Cl.
G06F 7/00 (2006.01)
G06F 17/00 (2006.01)
G06F 12/00 (2006.01)

(52) U.S. Cl. ...................... 707/698; 711/216
(58) Field of Classification Search .......... 707/687, 707/696, 698, 999.006; 370/392; 711/216
See application file for complete search history.

(56) References Cited

U.S. PATENT DOCUMENTS

| | | | |
|---|---|---|---|
| 5,920,900 A | 7/1999 | Poole et al. | |
| 7,116,664 B2 * | 10/2006 | Davis et al. | 370/392 |
| 7,349,397 B2 * | 3/2008 | Davis et al. | 370/392 |
| 7,403,527 B2 * | 7/2008 | Davis et al. | 370/392 |
| 2006/0184556 A1 * | 8/2006 | Tan et al. | 707/101 |
| 2006/0265372 A1 * | 11/2006 | Davis et al. | 707/7 |
| 2007/0286194 A1 * | 12/2007 | Shavitt et al. | 370/392 |
| 2008/0098015 A1 * | 4/2008 | Davis et al. | 707/100 |

* cited by examiner

Primary Examiner—Hung T Vy

(57) ABSTRACT

A method and system to perform exact match searches for fixed- or variable-length keys stored in a search database. The method is implemented using a plurality of hash tables, each indexed using an independent hash function. A system implementing this method provides deterministic search time, independent of the number of keys in the search database. The method permits two basic implementations; one which minimizes memory storage, and another which minimizes search time. The latter requires only two memory accesses to locate a key.

16 Claims, 7 Drawing Sheets

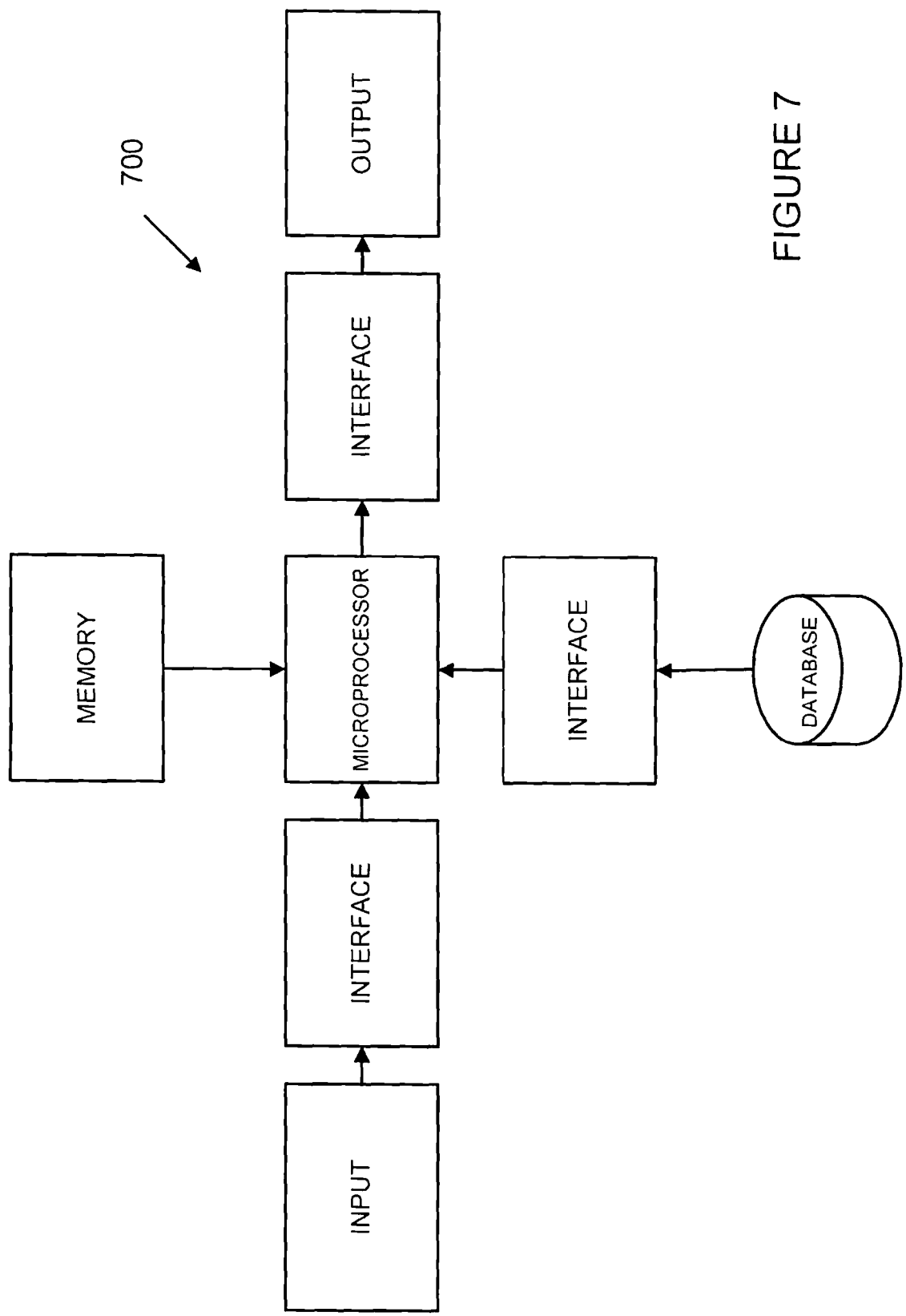

METHOD AND SYSTEM FOR PERFORMING EXACT MATCH SEARCHES USING MULTIPLE HASH TABLES

BACKGROUND

Basic hashing works by computing a hash index $I=H(K)$, $I \in S_I$, where $K \in S_K$ is the key and $H( )$ is a hash function that maps elements of key space $S_K$ into a smaller index space $S_I$. I is used to index a hash table, which may either store one or more keys which hash to the same index directly, or a pointer to the key storage.

Hashing is frequently used as a mechanism to perform exact match searches of fixed- or variable-length keys. These searches may be performed to extract data from a results database that is associated with each stored key: e.g., Quality of Service (QoS) processing information for a packet flow which is defined by a key composed of certain packet header values. While hashing has good (O(1)) average search time, it has a worst case search time of O(N) for N keys, due to the possibility of hash collisions.

FIG. 1 is a graph 100 illustrating the probability of hash collision P for a new key inserted into a hash table as a function of the table's load, defined as tile ratio of already inserted keys N to the number of bins B in the hash table. Here, simple uniform hashing is assumed, that being where any key will hash into any bin with equal probability. In FIG. 1, the results are plotted for B ranging from 100 to 10000000, and it is observed that the resulting curve is insensitive to the absolute value of B. Note that P is approximately proportional to $\alpha$ for small values of $\alpha$. The collision probability P at load $\alpha$ is equivalent to the expected fraction of occupied hash bins at that load. This is also equal to the expected fraction of keys that collide with another key at that load. Hash collisions can be resolved through a variety of mechanisms, including chaining, double hashing, open addressing, coalesced hashing, 2-choice hashing, and 2-left hashing. Disadvantageously, none of these mechanisms offer a deterministic search time for every key.

An arbitrarily low ratio of colliding entries can only be achieved by operating at a low load; that is by making B large relative to N. However, this results in a waste of memory space.

Exact match searches for fixed- or variable-length keys in databases is a common problem in computer science, especially in the context of packet forwarding e.g., Ethernet Media Access Control (MAC) lookup, and Internet Protocol (IP) 6-tuple flow lookup. Often in these applications, tens of millions or hundreds of millions of searches must be completed per second. In the context of packet forwarding, the database key might be anywhere from 16 to 48 bytes in size. Conventional solutions often involve sophisticated memory technology, such as the use of binary or ternary content addressable memory (CAMs), or combinations of well-known hashing techniques with memory technology, to retrieve those keys which are not conveniently resolved by the hashing technique.

Conventional hash-based solutions cannot provide deterministic search time due to the need to resolve hash collisions, which in the worst case can be O(N) for N keys, whereas solutions which depend on sophisticated memory technology are typically expensive, have low density, and have high power consumption.

The concept of using multiple hash tables is known in the art. For example, it is a basic component of the well-known 2-choice hashing and 2-left hashing methods. The method described in U.S. Pat. No. 5,920,900 to N. Poole, et al., while it uses multiple hash tables for collision resolution, does not bound every search to at most two hash table lookups.

What is desired is a solution that provides deterministic search time, with bounded memory.

SUMMARY

The present invention relates to database access operations in computer systems. More particularly, and not by way of limitation, the present invention can be implemented in networking equipment, primarily in Ethernet switches and routers for wired networks which might be providing wireless traffic backhaul. Further, the present invention can be implemented in database search applications outside of networking equipment.

In the context of forwarding in packet networks, fields in packet headers are used to access one or more databases which may store forwarding, QoS, security, and accounting context necessary to process and forward, or discard, the packet. A search key composed of one or more packet header fields is generated, and a database is searched using either exact (binary) match, longest prefix match, or ternary match methods.

In an embodiment of the present invention, hash collisions in a base hash function are resolved in separate secondary hash tables. Further, if keys are inserted in the separate hash tables such that every key that collides in the base hash function is stored in the same secondary hash table, without collision with any other key stored in that table, then the identity of that table can be stored as a result of the base hash table search, bounding the maximum number of hash tables that need to be searched to two. The invention also considers the maximum amount of memory needed for the complete set of hash tables, as a function of the number of keys to store.

The present invention is novel over multiple hash tables as it is adapted to store keys such that the base hash function lookup can be used to resolve the secondary hash table where a particular set of keys (those that collide at a particular value in the base hash function) are stored.

BRIEF DESCRIPTION OF THE DRAWINGS

In the following section, the invention will be described with reference to exemplary embodiments illustrated in the Figures, in which:

FIG. 7 is a block diagram illustrating the components of an embodiment of the present invention.

DETAILED DESCRIPTION OF THE INVENTION

Figure 1:
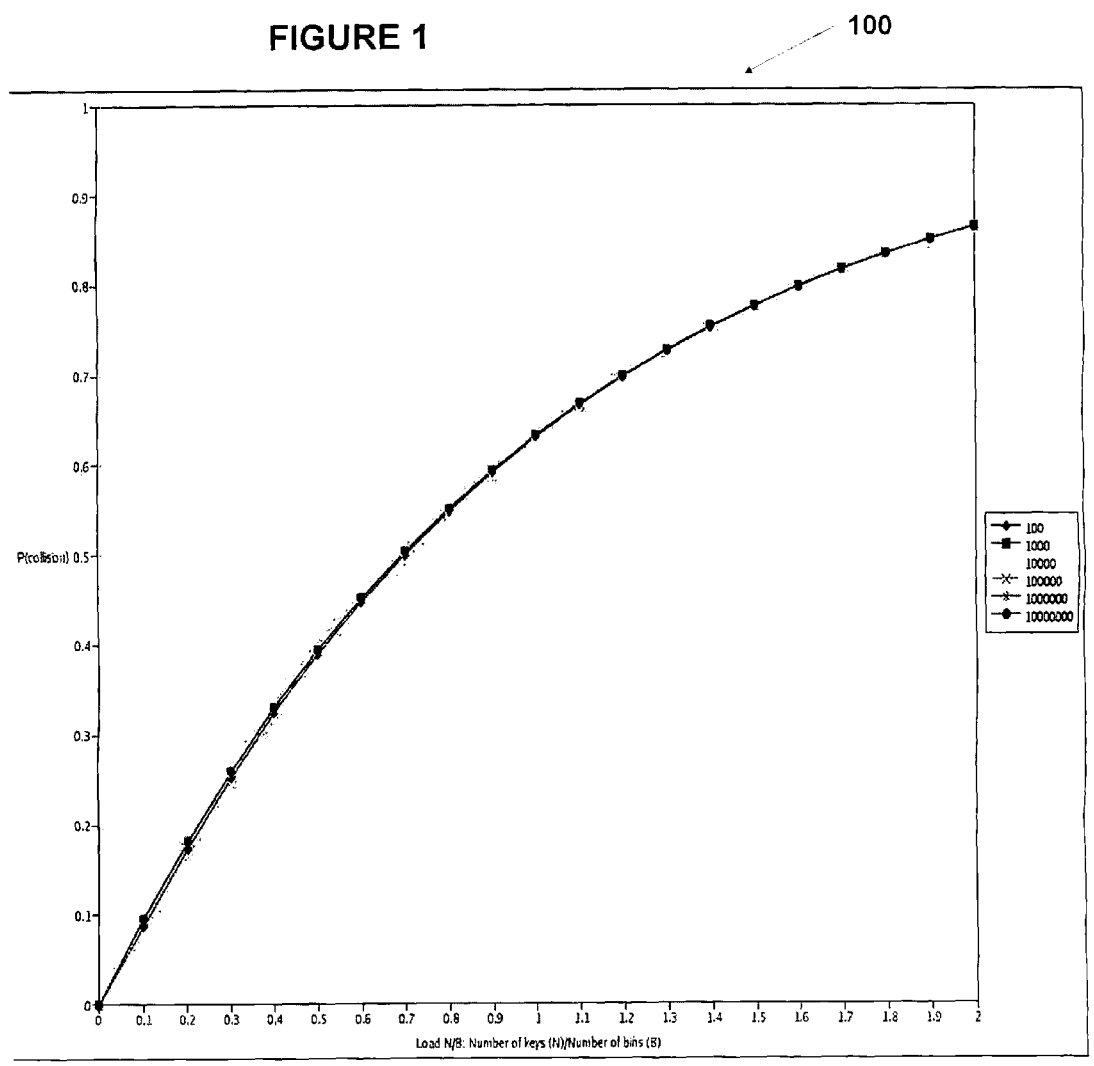
FIG. 1 illustrates the probability of hash collision P for a new key inserted into a hash table as a function of the table's load.

As seen in the graph 100 of FIG. 1, values of $\alpha \sim 0.69$ or less, $P \leq 0.5$ that is at least half of the bins are empty and at least half of the keys do not collide. By removing the keys that collide with hash function $H( )$ and hashing them using a second function and table, it is possible to achieve a deterministic search time for all those keys which don't collide in H( ). This process can be repeated using additional independent hash functions and tables, until all keys are hashed without collision. Given $N \leq 0.69 \times B_0$ ($\alpha \leq 0.69$), the number of hash functions and tables needed will converge to a value $<<N$ as long as the number of unstored, i.e., colliding, keys at each stage j is no greater than $0.69 \times B_{j+1}$, where $B_j$ is the size of the hash table at stage j. Since the number of collisions is less than or equal to half of the remaining keys at each stage, the subsequent hash tables can each be half the size of the previous one. Assuming that $B_0 = 2^{M+1}$, then $I_0$ can be represented in M bits, and M hash tables can be realized, each half the size of the other, such that the total memory utilized for hash tables is $2 \times B_0 = 2^{M+1}$ times the space needed for each individual hash bin (either a pointer or a matching key).

Such a structure of hash tables should store at least $0.69 \times 2^M$ keys without collision. In the worst-case, a database search for key K may require M independent hash searches. This worst-case can be reduced to a maximum of two hash searches using the method and system of the present invention.

In the present inventions when inserting a new key into the search database, all keys that it may collide with in the base (first) hash function $H_0(\ )$ must be stored in the same hash table $T_j[\ ]$, $j \in \{0, M-1\}$, without collision. This allows the use a table_id field in each entry of the base hash table to indicate which of the M hash tables a particular search key may be stored in. Then a worst-case search would consist of computing the base hash function for key K. $I_0 = H_0(K)$, checking the table_id field value j in the base hash table at index $I_0$, $j \subset T_0[I_0]$, computing the jth hash function $I_j = H_j(K)$ (assuming $j \neq 0$), and comparing the key stored, directly or indirectly, at $T_j[I_j]$.

The present invention has two embodiments: one which minimizes memory storage, and another which minimizes search time. The embodiment of the present invention which minimizes memory storage uses the data structures 200 of FIG. 2.

The data strictures consist of three tables: an index_tbl 201, a hash_tbl 202, and a key_tbl 203. The index_tbl 201 is of size $B_0 = 2^M$, and each entry I stores a table_id value, which is used to indicate which of the AM hash tables the set of keys colliding in the base hash with value I are stored in. A special value of table_id (EMPTY) is reserved if there are no keys in the search database that hash to I in the base hash function, hash_tbl 202 is used to store the M hash tables, as pointers to the key storage in key_tbl 203, hash_tbl 202 is of size $2 \times B_0 = 2^{M+1}$: and each hash table is logically appended to the end of the previous one (at offset(T)=$2 \times B_0 \times (1-2^{-T})$; e.g., offset(0)=0; offset(1)=$B_0$; offset(2)=$1.5 \times B_0$: offset(3)=$1.75 \times B_0$). Each entry in hash_tbl 202 contains either NULL or a pointer to an entry in key_tbl 203. Each key_tbl entry stores a key in the search database, a next pointer to another key_tbl entry, and a pointer to an entry in a results database, which stores the context information associated with the key_tbl entry. The next pointer is used to chain together all of the keys that collide in the base hash at a particular index, which is needed to facilitate insertions and deletions. When a key K does not collide with another key in the base hash, it is stored in the first hash table, i.e., in the top half of hash_tbl 202; otherwise it is stored in one of the secondary hash tables, i.e., in the bottom half of hash_tbl 202. When K collides in the base hash function, the slot in hash_tbl 202 indexed by Ho(K) can be used to point to the key_tbl 203 entry which is the root of the linked list of key entries which collide with K in the base hash.

Figure 2:
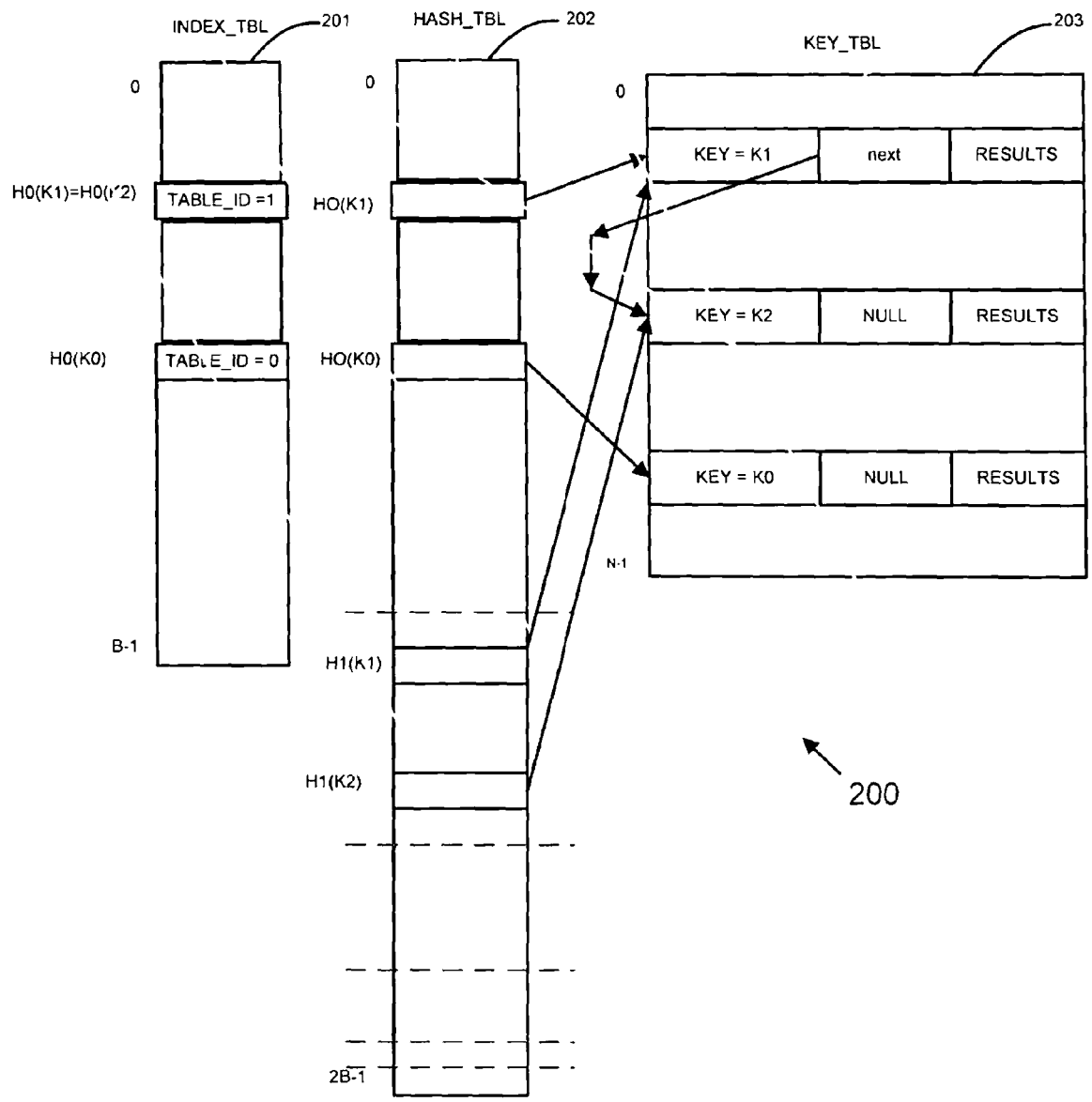
FIG. 2 is a data structure used in an embodiment of the present invention.

FIG. 2 shows the use of three keys $(K_0, K_1, K_2)$, where $K_1$ and $K_2$ collide in the base hash. $K_0$ is (logically) stored in the first hash table (indicated by the table_id=0 at index $H_0(K_0)$ of index_tbl). At the corresponding index in hash_tbl 202 there is a pointer to the entry in key_tbl 203 storing $K_0$, $K_1$ and $K_2$ are (logically) stored in the second hash table. The second hash function $H_1(\ )$ is used to generate indices for hash_tbl 202, whose corresponding entries point to the key storage for $K_1$ and $K_2$. Those two key entries are linked in a list whose root can be reached via a pointer stored in hash_tbl 202 at index $H_0(K_1) = H_0(K_2)$, key_tbl 203 need be only of size N (the maximum number of keys supported).

Figure 3:
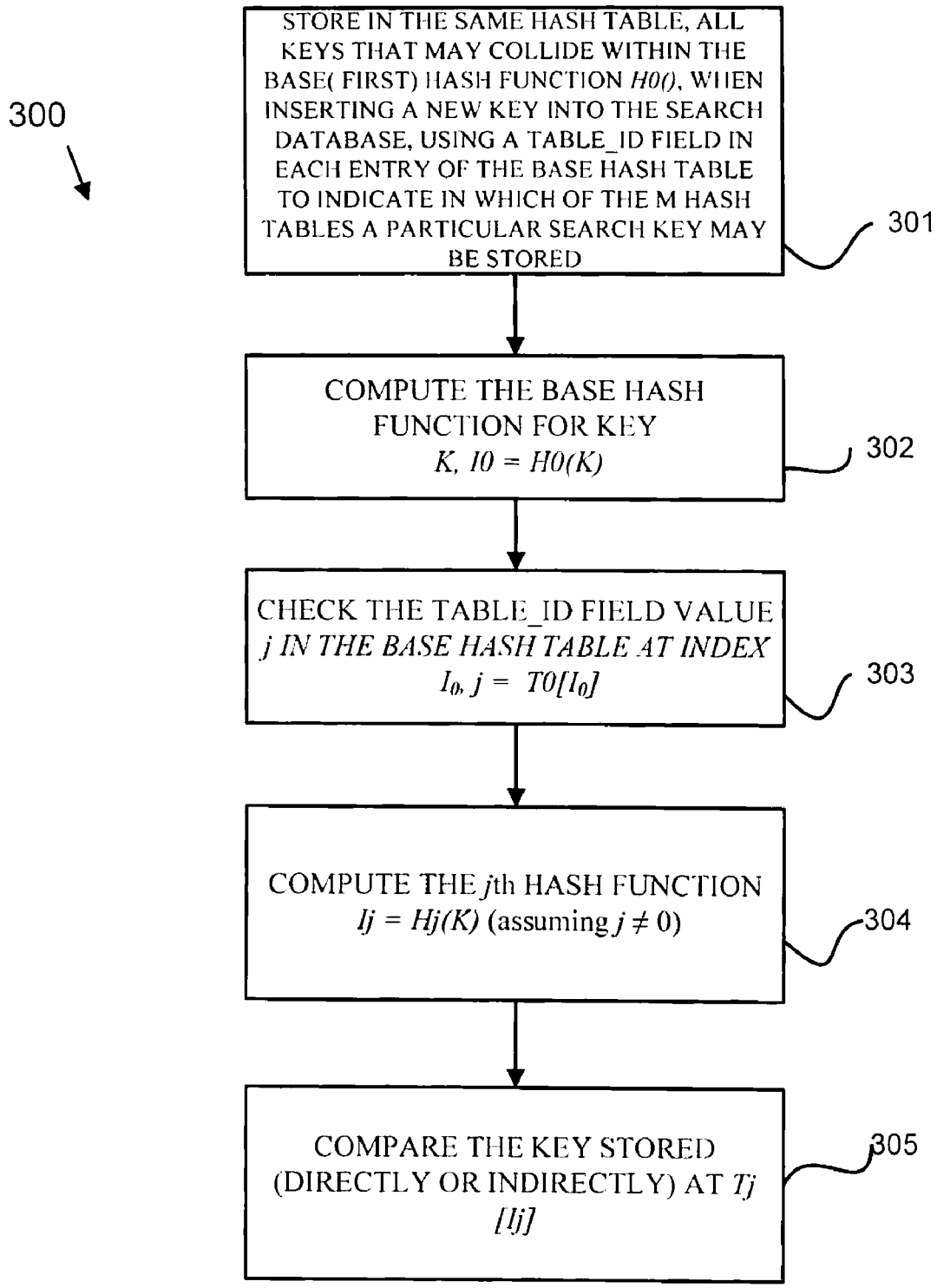
FIG. 3 is a flow chart illustrating the steps of an embodiment of the present invention.
Figure 4:
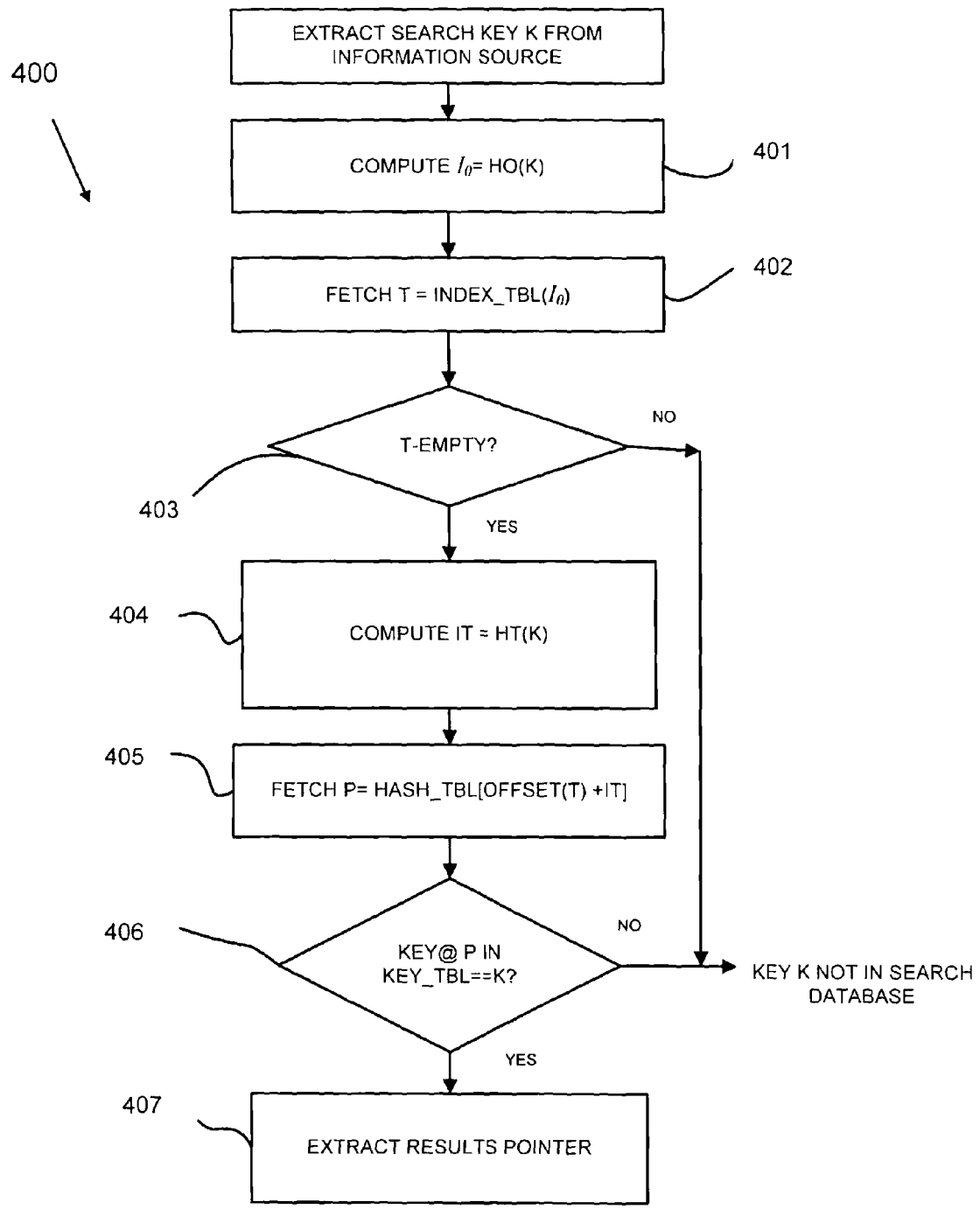
FIG. 4 is a flow chart illustrating the steps of searching for keys in an embodiment of the present invention.
Figure 5:
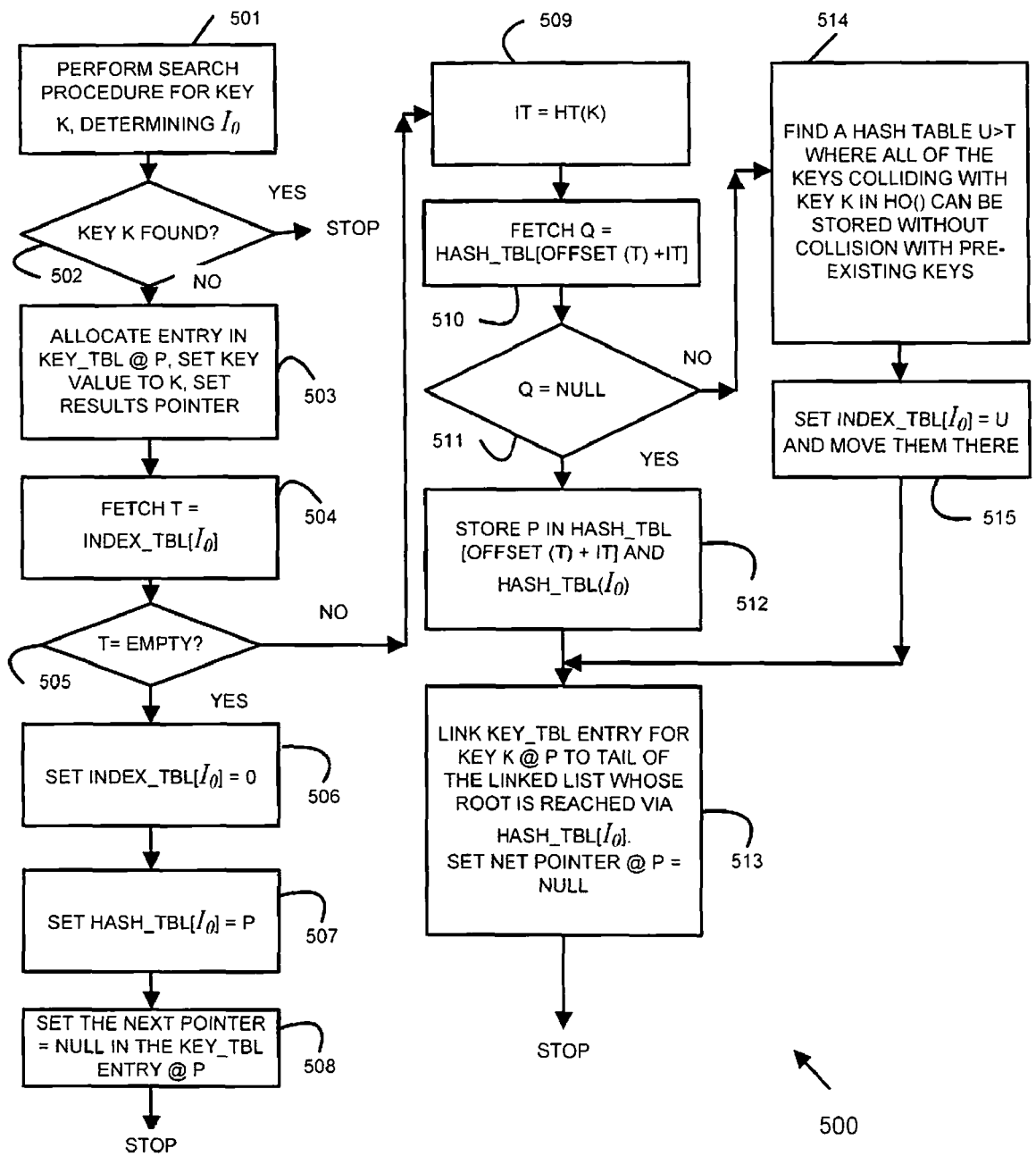
FIG. 5 is a flow chart illustrating the steps of inserting keys in an embodiment of the present invention.
Figure 6:
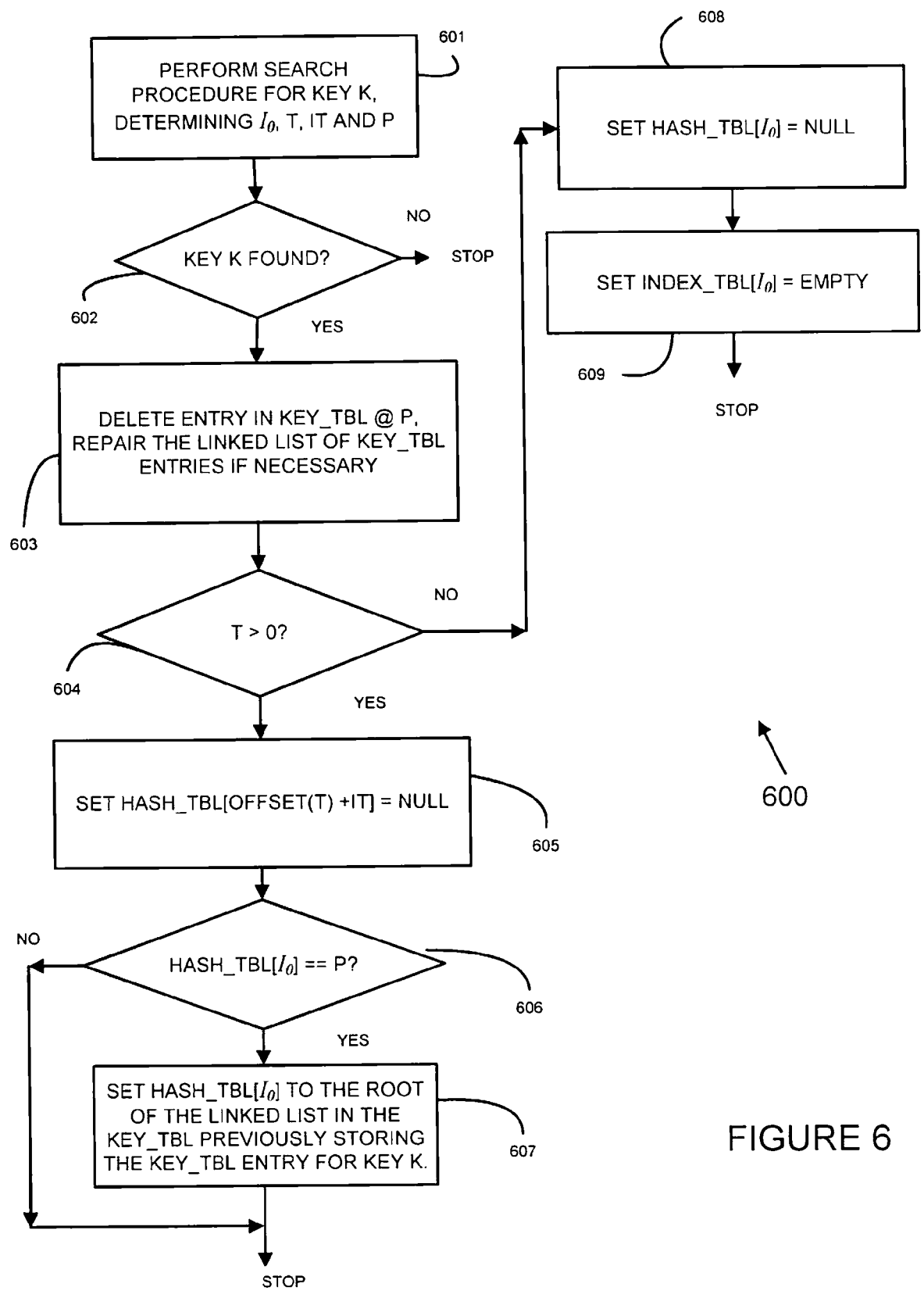
FIG. 6 is a flow chart illustrating the steps of deleting keys in an embodiment of the present invention.

FIG. 3 is a flow chart 300 of the steps of an embodiment of the present invention, while FIGS. 4-6 are flow charts of the procedures for searching for, inserting, and deleting keys in an embodiment of the present invention.

In FIG. 3, a method of performing exact match searches using multiple hash tables is provided. Step 301 comprises the step of storing in the same hash table, all keys that it may collide with in the base (first) hash function $H_0(\ )$, when inserting a new key into the search database, using a table_id field in each entry of the base hash table to indicate which of the M hash tables a particular search key may be stored in. Step 302 comprises the step of computing the base hash function for key K. $I_0 = H_0(K)$. Step 303 is the step of checking the table_id field value j in the base hash table at index $I_0$, $j = T_0[I_0]$. Step 304 is the step of computing the jth hash function $I_j = H_j(K)$ (assuming $j \neq 0$); and step 305 is the step of comparing the key stored (directly or indirectly) at $T_j[I_j]$.

FIG. 4 is a flow chart 400 illustrating the steps of searching for key K:

401: Compute $I_0 = H_0(K)$.
402: Fetch T=index_tbl[$I_0$].
403: If T=EMPTY, stop (K is not in the search database).
404: Otherwise, compute $I_T = H_T(K)$.
405: Fetch P=hash_tbl[offset(T)+$I_T$] (shift $I_T$ into the correct hash table range in hash_tbl).
406: Compare the key value stored in the key_tbl entry at address P to K. If they do not match, then K is not in the search database. If they do match, in step 407, extract the results pointer. Note that searching is O(1) complexity.

FIG. 5 is a flow chart 500 illustrating the steps of inserting key K:

501: Search for key K, determining $I_0$.
502: If it is found, stop.
503: Allocate an entry in key_tbl (at address P), set the key value to K, and set the results pointer appropriately.
504: Fetch T=index_tbl[$I_0$].
505: If T=EMPTY, in step 506, set index_tbl[$I_0$]=0. Otherwise, go to step 509.
507: Set hash_tbl[$I_0$]=P.
508: Set the next pointer value in the key_tbl entry for K to NULL and stop.
509: Otherwise (T≠EMPTY), compute $I_T = H_T(K)$.
510: Fetch Q=hash_tbl[offset(T)+$I_T$].
511: If Q=NULL, in step 512, store P at hash_tbl[offset(T)+$I_T$] and at hash_tbl[$I_0$]. Otherwise, go to step 514.
513: Link the key_tbl entry for K to the tail of the linked list whose root is reached via hash_tbl[$I_0$] (if T>0), terminate the list, and stop.
514: Otherwise (Q≠NULL), take the list of keys colliding with K in the base hash, find a new U>T where they each can be inserted without collision with other pre-existing keys, and move them there.
515: Set index_tbl[$I_0$]=U.

Return to step 513: Link the key_tbl entry for K to the tail of the linked list whose root is reached via hash_tbl[$I_0$], terminate the list, and stop.

Insertion complexity as described here is O(M).

FIG. 6 is a flow chart 600 illustrating the steps of deleting key K:

601: Search for key K, determining $I_0$, T, $I_T$, and P.

602: Key found? If it is not found, stop.

603: Delete the key entry stored in key_tbl at address P. If the entry is in the middle of a linked list of key entries, repair the list.

604: If T>0, in step 605, set hash_tbl[offset(T)+$I_T$]=NULL. Otherwise, go to step 608.

606: If hash_tbl[$I_0$]=P, in step 607, change hash_tbl[$I_0$] to point to the first entry in the linked list in key_tbl previously storing key K and stop. If hash_tbl[$I_0$] does not=P, stop.

608: If (T=0), set hash_tbl[$I_0$]=NULL.

609: Set index_tbl[$I_0$]=EMPTY and stop.

There may be cases of pathological keys, where, for a static set of hash functions $H_i(\ )$, $i\in\{0, M-1\}$, the keys collide in every hash function, or there is no hash table that can be found where there is not a collision with at least one other key. In this event, one or more of the hash functions can be permuted (e.g., by changing the seed value for the hash function) and the keys that were stored in the corresponding hash table reinserted. This may increase the insertion time substantially.

An embodiment of the method of the present invention which is optimized for search time would eliminate the need to perform step 405 of the search procedure by eliminating the separate hash_tbl, and extending key_tbl to size $2\times B_0$. For large keys. e.g., larger than four bytes, this would typically result in an increase in memory usage as compared to the alternative embodiment.

The method of the present invention described above was implemented using random 16-byte keys. The Fowler/Noll/Vo FNV-1a hash function was used with different seed values to realize each hash function.

Two execution runs are shown in Tables 1 and 2, each with M=20, for $\alpha$=0.69 (725000 keys) and $\alpha$=0.90 (945000 keys)($\alpha$ is relative to $B_0=2^M$). Table 1 shows the results of the former and Table 2 shows the results of the latter. Memory required for the first run was 23.937.184 bytes (assuming 16-byte keys) and for the second run, 28,337,184 bytes. The memory size difference was due to the greater size of key_tbl.

As can be seen, the results for $\alpha$=0.69 use fewer hash tables than what would have been expected from the discussion above. The results for $\alpha$=0.90 show that there are only a few bins left in the unused hash tables (126). It was also observed that some executions for $\alpha$=0.90 did not converge (without permuting the hash tables).

TABLE 1 multi_hash execution for M = 20, $\alpha$ = 0.69 (725000 keys).

| Hash table | # bins | #keys stored | $\alpha$ of hash table | Cumulative fraction of total keys stored |
|---|---|---|---|---|
| 0 | 1048576 | 362620 | 0.34 | 0.50 |
| 1 | 524288 | 222543 | 0.42 | 0.80 |
| 2 | 262144 | 92949 | 0.35 | 0.93 |
| 3 | 131072 | 34794 | 0.26 | 0.98 |
| 4 | 65536 | 10345 | 0.15 | 0.99 |
| 5 | 32768 | 1661 | 0.05 | 0.99 |
| 6 | 16384 | 88 | 0.01 | 0.99 |
| 7 | 8192 | 0 | 0 | 1.0 |
| 8 | 4096 | 0 | 0 | 1.0 |
| 9 | 2048 | 0 | 0 | 1.0 |
| 10 | 1024 | 0 | 0 | 1.0 |
| 11 | 512 | 0 | 0 | 1.0 |
| 12 | 256 | 0 | 0 | 1.0 |
| 13 | 128 | 0 | 0 | 1.0 |
| 14 | 64 | 0 | 0 | 1.0 |
| 15 | 32 | 0 | 0 | 1.0 |
| 16 | 16 | 0 | 0 | 1.0 |
| 17 | 8 | 0 | 0 | 1.0 |
| 18 | 4 | 0 | 0 | 1.0 |
| 19 | 2 | 0 | 0 | 1.0 |

TABLE 2 multi_hash execution for M = 20, $\alpha$ = 0.90 (945000 keys).

| Hash table | # bins | #keys stored | $\alpha$ of hash table | Cumulative fraction of total keys stored |
|---|---|---|---|---|
| 0 | 1048576 | 384926 | 0.36 | 0.401 |
| 1 | 524288 | 289999 | 0.55 | 0.71 |
| 2 | 262144 | 139461 | 0.53 | 0.86 |
| 3 | 131072 | 67590 | 0.51 | 0.93 |
| 4 | 65536 | 33029 | 0.50 | 0.96 |
| 5 | 32768 | 15838 | 0.48 | 0.98 |
| 6 | 16384 | 7742 | 0.47 | 0.99 |
| 7 | 8192 | 3622 | 0.44 | 0.99 |
| 8 | 4096 | 1745 | 0.42 | 0.99 |
| 9 | 2048 | 759 | 0.37 | 0.99 |
| 10 | 1024 | 290 | 0.28 | 0.99 |
| 11 | 512 | 88 | 0.17 | 0.99 |
| 12 | 256 | 20 | 0.07 | 0.99 |
| 13 | 128 | 2 | 0.01 | 0.99 |
| 14 | 64 | 0 | 0 | 1.0 |
| 15 | 32 | 0 | 0 | 1.0 |
| 16 | 16 | 0 | 0 | 1.0 |
| 17 | 8 | 0 | 0 | 1.0 |
| 18 | 4 | 0 | 0 | 1.0 |
| 19 | 2 | 0 | 0 | 1.0 |

Referring now to FIG. 7, a block diagram 700 illustrating the components of an embodiment of the present invention is presented. As seen therein, the present invention can be implemented using standard memory technology (e.g., DRAM). The search mechanism can be implemented either in software on a general purpose processor or network processor, or in computer hardware, such as a field programmable gate array (FPGA) or application specific integrated circuit (ASIC). The insertion and deletion mechanisms can be implemented in software on a general purpose processor. The total amount of memory required is on the order of twice the amount of memory needed to store the keys in the database (for 16 byte keys). Said system is adapted to perform exact match searches in deterministic time using multiple hash tables, and comprises means for storing in the same hash table, all keys that it may collide with in the base (first) hash function $H_0(\ )$, when inserting a new key into the search database, using a table_id field in each entry of the base hash table to indicate which of the M hash tables a particular search key may be stored in; means for computing the base hash function for key K, $I_0=H_0(K)$; means for checking the table_id field value j in the base hash table at index $I_0$, $j=T_0[I_0]$; means for computing the jth hash function $I_j=H_j(K)$ (assuming $j\neq 0$); and means for comparing the key stored (directly or indirectly) at $T_j[I_j]$. The system of the present invention is further adapted to perform the above referenced steps of the method of the present invention.

Advantages of the present invention over conventional methods and systems include the ability to search both fixed-length and variable-length search keys, whereas the conventional methods and systems assume fixed-length keys. Note that variable-length keys could be stored in a fixed-length field along with a key length. These conventional methods and systems assume a single hash function, which computes a hash value that must map 1:1 with the search key of equal length. Subsets of this hash value are used as indices into each of the multiple hash tables. Conventional methods and systems assume that the implementation stores information in each hash table entry to extract subsets of the hash value to be used to index a secondary or tertiary hash table for collision resolution, whereas the present invention uses a label in the index table (indexed by the base hash function) to indicate a separate hash function (which could be computed in parallel with the first hash function when implemented in hardware). Also, conventional methods and systems define a method which does not guarantee a maximum search time, whereas the present invention guarantees a maximum search time of two hash lookups. Finally, the conventional method and system is much less memory efficient than the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

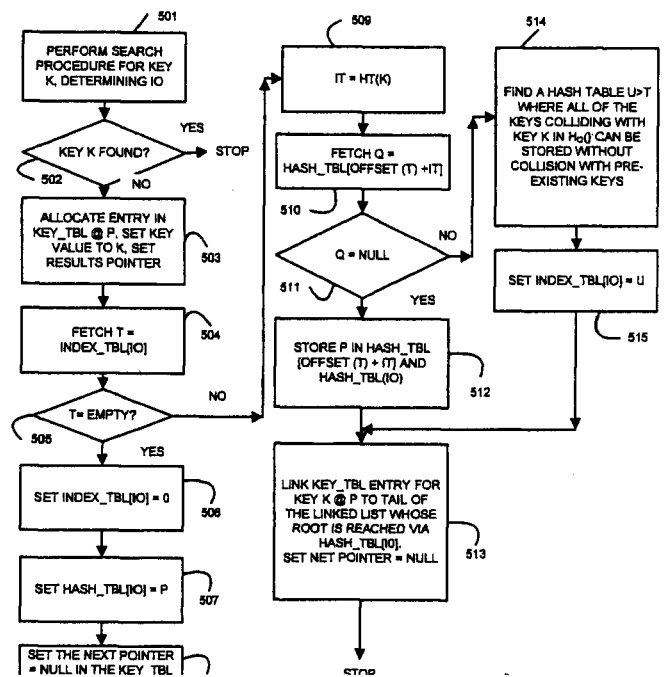

What is claimed:

1. A method of performing exact match searches using multiple hash tables, comprising the steps of:
    searching in the same hash table, all keys K that it can collide with in a base (first) hash function $H_0(\ )$; wherein the step of searching for key K further comprises the steps of:
        computing $I_0=H_0(K)$;
        fetching $T=index\_tbl[I_0]$;
        if T=EMPTY, stopping the search as K is not in the search database, otherwise, computing $I_T=H_T(K)$;
        fetching $P=hash\_tb1[offset(T)+I_T]$; and
        comparing the key value stored in the key_tbl entry at address P to K and if they do not match, stopping, otherwise, extracting the results pointer;
    storing in the same hash table, all keys that it can collide with in the base (first) hash function $H_0(\ )$,
    inserting key K into a search database;
    when inserting a new key into the search database, using a table_id field in each entry of the base hash table to indicate which of the M hash tables a particular search key can be stored in;
    computing the base hash function for key K, $I_0=H_0(K)$;
    checking the table_id field value j in the base hash table at index $I_0$, $j \subset T_0[I_0]$;
    computing the jth hash function $I_j=H_j(K)$ (assuming $j\neq 0$);
    comparing the key stored (directly or indirectly) at $T_j[I_j]$; and
    deleting key K.

2. The method of claim 1, for use in packet forwarding operations.

3. The method of claim 2, wherein the packet forwarding operation is an Ethernet Media Access Control (MAC) lookup.

4. The method of claim 2, wherein the packet forwarding operation is an Internet Protocol (IP) 6-tuple flow lookup.

5. The method of claim 1, wherein the step of inserting key K further comprises the steps of:
    searching for key K, determining $I_0$, and if key K is found, stopping the search;
    if key K is not found: allocating an entry in key_tbl (at address P), setting the key value to K, and setting the results pointer appropriately;
    fetching $T=index\_tbl[I_0]$;
    if T=EMPTY, setting $index\_tbl[I_0]=0$, otherwise, computing $I_T=H_T(K)$;
    setting $hash\_tbl[I_0]=P$;
    setting the next pointer value in the key_tbl entry for K to NULL and stopping, otherwise (T$\neq$EMPTY), computing $I_T=H_T(K)$;
    fetching $Q=hash\_tbl[offset(T)+I_T]$;
    If Q=NULL, storing P at $hash\_tbl[offset(T)+IT]$ and at $hash\_tbl[H_0]$, otherwise, taking the list of keys colliding with K in the base hash, finding a new U>T where they each can be inserted without collision with other pre-existing keys, and moving them there;
    linking the key_tbl entry for K to the tail of the linked list whose root is reached via $hash\_tbl[I_0]$ (if T>0), terminating the list, and stopping, otherwise (Q$\neq$NULL), taking the list of keys colliding with K in the base hash, finding a new U>T where they each can be inserted without collision with other pre-existing keys, and moving them there;
    setting $index\_tbl[I_0]=U$; and
    linking the key tbl_entry for K to the tail of the linked list whose root is reached via $hash\_tbl[I_0]$, terminating the list, and stopping.

6. The method of claim 1, wherein the step of deleting key K, further comprises the steps of:
    searching for key K, determining $I_0$, T, $I_T$, and P, and if key K is not found, stopping;
    if key K is found, deleting the key entry stored in key_tbl at address P and if the entry is in the middle of a linked list of key entries, repairing the list;
    if T>0, set $hash\_tbl[offset(T)+I_T]=NULL$, otherwise, setting $hash\_tbl[I_0]=NULL$;
    if $hash\_tbl[I_0]=P$, changing $hash\_tbl[I_0]$ to point to the first entry in the linked list in key_tbl previously storing key K and stopping, otherwise (T=0), setting $hash\_tbl[I_0]=NULL$; and
    setting $index\_tbl[I_0]=EMPTY$ and stopping.

7. A system of performing exact match searches using multiple hash tables, comprising:
    a microprocessor configured to search for key K; further compring:
        the microprocessor configured to:
        compute $I_0=H_0(K)$;
        fetch $T=index\_tbl[I_0]$;
        if T=EMPTY, stop the search as K is not in the search database, otherwise, compute $I_T=H_T(K)$;
        fetch $P=hash\_tbl[offset(T)+I_T]$ (shift $I_T$ into the correct hash table range in hash_tbl);
        compare the key value stored in the key_tbl entry at address P to K and if they do not match, then K is not in the search database, and if they do match, means for extract the results pointer;
    the microprocessor configured to insert key K;
    a memory for storing in the same hash table, all keys that it can collide with in the base (first) hash function $H_0(\ )$
    the microprocessor configured to for insert key K; when inserting a new key into the search database, using a table_id field in each entry of the base hash table to indicate which of the M hash tables a particular search key can be stored in;

the microprocessor configured to compute the base hash function for key K, $I_0=H_0(K)$;

the microprocessor configured to chrck the table_id field value j in the base hash table at index I, $j \subset T_0[I_0]$;

the microprocessor configured to compute the jth hash function $I_j=H_j(K)$ (assuming $j \neq 0$); and the microprocessor configured to compare the key stored (directly or indirectly) at $T_j[I_j]$;

the microprocessor configured to delete key K.

8. The system of claim 7, for use in packet forwarding operations.

9. The system of claim 8, wherein the packet forwarding operation is an Ethernet Media Access Control (MAC) lookup.

10. The system of claim 8, wherein the packet forwarding operation is an Internet Protocol (IP) 6-tuple flow lookup.

11. The system of claim 7, wherein the microprocessor configured to insert key K further comprises:

microprocessor configured to:

search for key K, determine $I_0$, and if it is found, stop the search;

the microprocessor configured to allocate an entry in key_tbl (at address P), set the key value to K, and set the results pointer appropriately;

the microprocessor configured to:

fetch $T=\text{index\_tbl}[I_0]$;

if T=EMPTY, set index_tbl[$I_0$]=0, otherwise, compute $I_T=H_T(K)$;

set hash_tbl[$I_0$]=P;

set the next pointer value in the key_tbl entry for K to NULL and stop;

otherwise (T≠EMPTY), means for computing compute $I_T=H_T(K)$;

fetch $Q=\text{hash\_tbl}[\text{offset}(T)+I_T]$;

if Q=NULL, store P at hash_tbl[offset(T)+IT] and at hash_tbl[$I_0$], otherwise, using the list of keys colliding with K in the base hash, find a new U>T where they each can be inserted without collision with other pre-existing keys, and move them there;

the microprocessor configured to:

link the key_tbl entry for K to the tail of the linked list whose root is reached via hash_tbl[$I_0$] (if T>0);

terminate the list, and stop, otherwise (Q≠NULL), take the list of keys colliding with K in the base hash, means for finding find a new U>T where they each can be inserted without collision with other pre-existing keys, and move them there;

set index_tbl[$I_0$]=U; and link the key_tbl entry for K to the tail of the linked list whose root is reached via hash_tbl[$I_0$], terminating the list, and stop.

12. The system of claim 7, wherein the microprocessor configuration to delete key K, further comprises:

search for key K, determining $I_0$, T, $I_T$, and P, and if it is not found, stop;

delete the key entry stored in key_tbl at address P and if the entry is in the middle of a linked list of key entries, repair the list;

if T>0, set hash_tbl[offset(T)+$I_T$]=NULL, otherwise, set hash_tbl[$I_0$]=NULL;

if hash_tbl[$I_0$]=P, change hash_tbl[$I_0$] to point to the first entry in the linked list in key_tbl where key K was previously stored and stop, otherwise (T=0), set hash_tbl[$I_0$]=NULL; and set index_tbl[$I_0$]=EMPTY and stopping stop.

13. The system of claim 7, as implemented on a non-transitory computer readable memory loaded from a memory into, and executed by, computer hardware.

14. The system of claim 13, wherein the computer readable memory is a DRAM memory.

15. The system of claim 13, wherein the computer hardware is a general purpose processor or network processor.

16. The system of claim 13, wherein the total amount of memory required for operation is on the order of twice the amount of memory needed to store the keys in the database, for 16 byte keys.

* * * * *

UNITED STATES PATENT AND TRADEMARK OFFICE
CERTIFICATE OF CORRECTION

PATENT NO. : 7,809,701 B2  
APPLICATION NO. : 11/872099  
DATED : October 5, 2010  
INVENTOR(S) : Blake Page 1 of 3

It is certified that error appears in the above-identified patent and that said Letters Patent is hereby corrected as shown below:

On the Title Page, in Figure, for Tag "514", in Line 3, delete "HO()" and insert -- $H_0()$ --, therefor.

In Fig. 2, Sheet 2 of 7, delete "HO(Kl)" and insert -- $H_0(K_1)$ --, therefor.

In Fig. 4, Sheet 4 of 7, for Tag "401", delete "HO(K)" and insert -- $H_0(K)$ --, therefor.

In Fig. 5, Sheet 5 of 7, for Tag "514", in Line 3, delete "HO()" and insert -- $H_0()$ --, therefor.

In Column 1, Line 24, delete "tile" and insert -- the --, therefor.

In Column 3, Line 12, delete "$B_0=2^{M+1}$," and insert -- $B_0=2^M$, --, therefor.

In Column 3, Line 23, delete "inventions" and insert -- invention, --, therefor.

In Column 3, Line 30, delete "K." and insert -- K, --, therefor.

In Column 3, Line 40, delete "strictures" and insert -- structures --, therefor.

In Column 3, Line 49, delete "$2 \times B_0=2^{M+1}$:" and insert -- $2 \times B_0=2^{M+1}$; --, therefor.

In Column 3, Line 64, delete "Ho(K)" and insert -- $H_0(K)$ --, therefor.

In Column 4, Line 25, delete "K." and insert -- K, --, therefor.

In Column 5, Line 42, delete "23.937.184" and insert -- 23,937,184 --, therefor.

In Column 8, Line 41, in Claim 6, delete "hash_tbl[$o$]" and insert -- hash_tbl[$I_0$] --, therefor.

Signed and Sealed this  
First Day of February, 2011

David J. Kappos  
*Director of the United States Patent and Trademark Office*

In Column 8, Line 50, in Claim 7, delete "compring:" and insert -- comprising: --, therefor.

In Column 9, Line 6, in Claim 7, delete "chrck" and insert -- check --, therefor.

In Column 9, Line 37, in Claim 11, after "(T≠EMPTY)" delete "means for computing".

In Column 10, Lines 8-9, in Claim 11, after "hash," delete "means for finding".

In Column 10, Line 29, in Claim 12, after "and" delete "stopping".

In Column 10, Line 36, in Claim 15, after "is a" delete "general purpose processor or".

(12) United States Patent
Blake

(10) Patent No.: US 7,809,701 B2
(45) Date of Patent: Oct. 5, 2010

(54) METHOD AND SYSTEM FOR PERFORMING EXACT MATCH SEARCHES USING MULTIPLE HASH TABLES

(75) Inventor: Steven Langley Blake, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 541 days.

(21) Appl. No.: 11/872,099

(22) Filed: Oct. 15, 2007

(65) Prior Publication Data
US 2009/0097654 A1  Apr. 16, 2009

(51) Int. Cl.
G06F 7/00 (2006.01)
G06F 17/00 (2006.01)
G06F 12/00 (2006.01)

(52) U.S. Cl. .................................. 707/698; 711/216
(58) Field of Classification Search .............. 707/687, 707/696, 698, 999.006; 370/392; 711/216
See application file for complete search history.

(56) References Cited

U.S. PATENT DOCUMENTS

| | | | |
|---|---|---|---|
| 5,920,900 A | 7/1999 | Poole et al. | |
| 7,116,664 B2* | 10/2006 | Davis et al. | 370/392 |
| 7,349,397 B2* | 3/2008 | Davis et al. | 370/392 |
| 7,403,527 B2* | 7/2008 | Davis et al. | 370/392 |
| 2006/0184556 A1* | 8/2006 | Tan et al. | 707/101 |
| 2006/0265372 A1* | 11/2006 | Davis et al. | 707/7 |
| 2007/0286194 A1* | 12/2007 | Shavitt et al. | 370/392 |
| 2008/0098015 A1* | 4/2008 | Davis et al. | 707/100 |

* cited by examiner

*Primary Examiner*—Hung T Vy

(57) ABSTRACT

A method and system to perform exact match searches for fixed- or variable-length keys stored in a search database. The method is implemented using a plurality of hash tables, each indexed using an independent hash function. A system implementing this method provides deterministic search time, independent of the number of keys in the search database. The method permits two basic implementations; one which minimizes memory storage, and another which minimizes search time. The latter requires only two memory accesses to locate a key.

16 Claims, 7 Drawing Sheets